Jan. 10, 1939.     V. L. JOHANNESSEN ET AL     2,143,417
STRAND HANDLING APPARATUS
Filed May 5, 1937
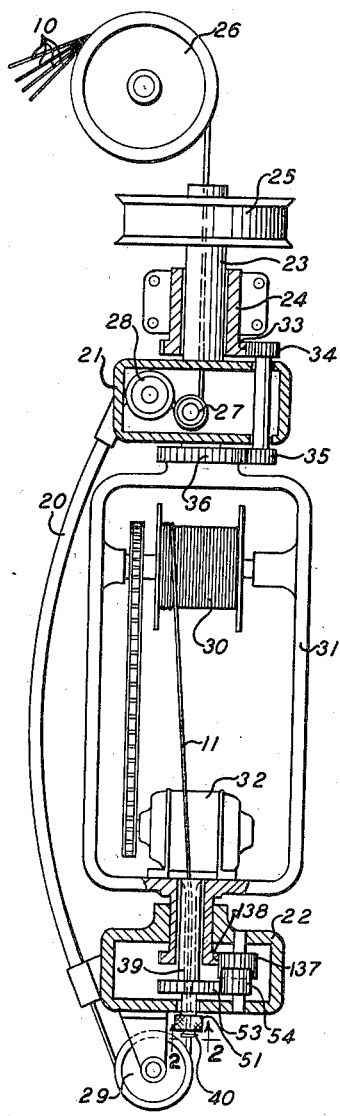
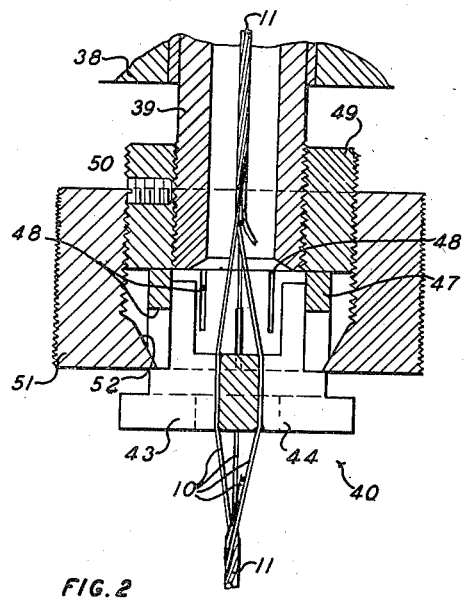
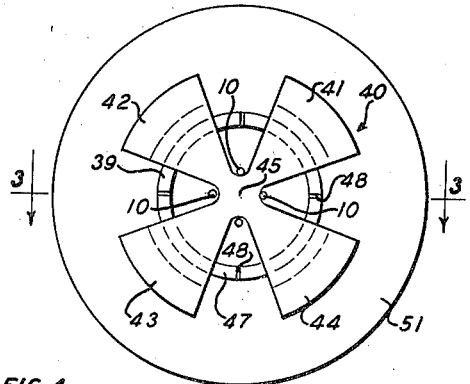
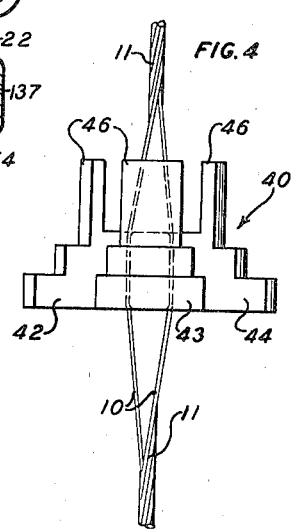
INVENTORS
V.L. JOHANNESSEN
S.T. SWALLOW
BY
E.R. Nowlan
ATTORNEY Patented Jan. 10, 1939

2,143,417

UNITED STATES PATENT OFFICE 2,143,417

STRAND HANDLING APPARATUS

Vaughn L. Johannessen, Cranford, and Sidney T. Swallow, Westfield, N. J., assignors to Western Electric Company, Incorporated, New York, N. Y., a corporation of New York Application May 5, 1937, Serial No. 140,880

4 Claims. (Cl. 117—9.5)

This invention relates to strand handling apparatus and more particularly to apparatus for intertwisting a plurality of strands to form a compound strand.

In the manufacture of multiconductor cables for use in the communications arts it may become of importance to intertwist a plurality of conductor strands with unusual regularity of lay of the component strands individually and with respect to each other in order to obtain uniformity of electrical properties dependent in part upon the geometrical relations in space of the component strands to each other.

An object of the present invention is to provide an apparatus in which a compound strand consisting of a plurality of intertwisted strands may be produced with maximum regularity of lay of the component strands.

With such and other objects in view, one embodiment of the invention contemplates a machine for twisting strands together which includes means for intertwisting strands in combination with a driven rotary combing member which acts to separate the intertwisted strands laterally from each other, comb them out, and again combine them together.

Other objects and features of the invention will appear from the following detailed description of one embodiment thereof taken in connection with the accompanying drawing in which the same reference numerals are applied to identical parts in the several figures and in which—

Fig. 1 is a view in side elevation and partly in section of a flier for intertwisting strands with which is combined a twist normalizing device constructed in accordance with the invention;

Fig. 2 is an enlarged reverse plan view of the normalizing device;

Fig. 3 is a sectional view on the line 3—3 of Fig. 2, and

Fig. 4 is a detached view in side elevation of the normalizing member.

The apparatus herein disclosed comprises a tubular flier arm 20 mounted on rotatable heads 21 and 22, the upper head 21 being journalled by an integral hollow shaft 23 in a suitable stationary supporting member 24. The shaft 23 may be driven by any suitable motor means, not shown, through a pulley 25 on the shaft and thereby drive the flier. Above the member 24 is a capstan or the like 26 driven by any suitable means, not shown, at constant speed and over which strands 10, in this instance four in number, pass to enter the flier to be intertwisted thereby.

The strands 10 pass down from the capstan 26, through the shaft 23 and into the hollow flier head 21. Here they pass over a guide sheave 27 mounted in the head 21 to revolve therewith and to be substantially tangential to the axis of revolution of the flier. From the sheave 27 the strands 10 pass over a second guide sheave 28, also mounted in the head 21 to revolve therewith and to be tangential to the entrance direction of the flier arm 20. The strands 10 pass from the sheave 28 through the arm 20 and over a guide sheave 29 mounted on the flier head 22 to revolve therewith and to be tangential to both the exit direction of the flier 20 and the axis of revolution of the flier. From the sheave 29 the strands 10 pass axially up through the flier head 22 to a take-up reel 30 rotatably supported in a frame 31 positioned within the surface of revolution of the flier.

The take-up reel 30 is driven by a motor 32 mounted within the frame 31. The frame is supported on journals in the heads 21 and 22 and is held stationary while the flier revolves about it by means of planetary gearings 33, 34, 35, 36 and 137, 138.

All of the apparatus above described is old and well known in the general art of intertwisting strands. The strands 10 are given one twist together per revolution of the flier in passing over the sheave 27 and another in passing from the sheave 29. Thus the pitch of lay of the compound strand 11 coming from the sheave 29 will depend upon the rotary speed of the flier 20 and the linear speed of the strand 11 as it is wound upon the take up 30. This linear speed of the strands will be controlled by the capstan 26. Hence the average pitch of lay of the strand will depend upon the ratio of the speeds of the flier 20 and capstan 26 which may easily be held constant in any suitable well known manner of forcing two rotary members to run at constant relative speeds.

Within the tubular lower journal member 38 of the frame 21 is journalled a tubular shaft 39 on the bottom end of which is mounted a twist normalizing member generally indicated by the numeral 40; and the shaft 39 is driven in rotation from the rotary flier head 22 by planetary gearing 53, 54. The strands 10 pass from the sheave 29 over the normalizer 40 and through the shaft 39 to the take up 30.

The normalizer 40 is a single integral member comprising four radial lobes 41, 42, 43 and 44 with vertical V-shaped slots between. These lobes are united centrally at a solid core 45 defined by the rounded vertices of the V-slots. Externally the lobes are stepped as best shown in Fig. 4. The lobes are solid across the member in the lower portion but the upper narrowest part has a central circular recess so that the upper portions of the lobes present four upstanding prongs 46.

The prongs 46 are received within a closely fitting collar 47 formed with longitudinal radial slots 48 extending alternately down from the upper rim of the collar and up from the bottom rim. These slots render the collar slightly compressible circumferentially and hence radially to grip the normalizer 40 by means of the prongs 46. Externally the collar 47 is bevelled at its lower rim.

The upper end of the collar 47 abuts against a sleeve 49 threadedly mounted on the outer surface of the bottom end of the shaft 39 to be vertically adjustable thereon and locked in any desired adjusted position by a set screw 50.

The outer surface of the sleeve 49 is also threaded to receive an annular locking member 51 mounted thereon. This member extends down and encircles the lower end of the collar 47, and is there formed internally with a female bevelled rim 52 matching the male bevel on the lower rim of the collar 47 and squeezing the collar 47 together to hold the normalizer 40 rigidly assembled with the sleeve 49 and thus adjustably rigidly on the shaft 39.

In operation the normalizer 40 is driven by the gears 53, 54 at a rotary speed which synchronizes exactly with the average rotary speed of the strands 10 about their mutual axes as they pass upwardly over the normalizer. At the normalizer the strands 10 are separated so that each passes alone through the bottom of one of the V-slots between the lobes of the normalizer. Beyond the latter, the four strands come together again into their proper, symmetrically arranged order with respect to each other.

With certain relations between the sizes of the strands 10 and the length of their pitch in the strand 11, it will happen that in passing over the guide sheaves, and particularly the sheave 27, the strand 11 will tend to be flattened and its component strands are forced out of their desired geometrical symmetry and relation to each other. Such derangements are combed out by the normalizer 40. But the normalizer must be independently driven at such speed that it follows exactly the spiral of the intertwisted strands 10, not being driven in rotation by the strands nor yet driving the strands.

If the normalizer be merely freely revoluble and is driven by the spiral of the strands, then such pitch variations will not be combed out at the same time that strand misplacements are corrected; while, if the normalizer is driven as described, both types of faulty lay are corrected at the same time. It may occur that slight variations in hardness or temper of the strands 10 will bring the strand 11 to the normalizer with consecutive portions of varying pitch.

While the apparatus as described is constructed to handle four strands only, it is evident that by changing the number of lobes on the normalizer it may be modified to handle any reasonable number of simultaneously intertwisted strands.

Also, in the apparatus described the rounded vertices of the dihedral angles between the lobes run substantially parallel to the axis of rotation of the normalizer and the local line of advance of the strand 11, and therefor at an angle to the normal spiral of the strands 10. In the case of a relatively long pitch of intertwist it is found that such a normalizer works very well, e. g., with four strands of single paper pulp insulated 24 ga. B & S copper wire intertwisted at a pitch of three inches or more. In the case of analogous wires intertwisted at much shorter pitches, obviously it might be preferable to make the lobes of the normalizer generally spiral by cutting the V-notches between them with spiral vertices.

While it is evidently simplest to make the normalizer by cutting V-slots and leaving lobes therebetween as described, it would evidently be in effect the same if the V-slots were replaced by U-slots or by bores or other passageways of suitable dimensions.

The embodiment of the invention herein disclosed is illustrative only and may be departed from and modified in many ways without departing from the spirit and scope of the invention as pointed out in and limited only by the appended claims.

What is claimed is:

1. In an apparatus for handling strands, means to intertwist a plurality of longitudinally advancing strands, and means to correct irregularities of twist comprising a rotary guide for the intertwisted strands, an element having spaced slots extending outwardly to the periphery thereof from spaced substantially parallel strand engaging surfaces to separate the strands individually while advancing, and means to removably secure the element to the guide.

2. In an apparatus for handling strands, means to intertwist a plurality of longitudinally advancing strands, and means to correct irregularities of twist comprising a rotary guide for the intertwisted strands, an element having spaced slots extending outwardly to the periphery thereof from spaced substantially parallel strand engaging surfaces to separate the strands individually while advancing, and means to secure the element to the guide in selective relative positions to position the slots of the element relative to the strands.

3. In an apparatus for handling strands, means to intertwist a plurality of longitudinally advancing strands, and means to correct irregularities of twist comprising a rotary guide for the intertwisted strands, an element having spaced slots extending outwardly to the periphery thereof from spaced substantially parallel strand engaging surfaces to separate the strands individually while advancing, and means to vary the position of the element relative to the guide.

4. In an apparatus for handling strands, means to intertwist a plurality of longitudinally advancing strands, and means to correct irregularities of twist comprising a rotary guide for the intertwisted strands, an element having spaced slots extending outwardly to the periphery thereof from spaced substantially parallel strand engaging surfaces to separate the strands individually while advancing, means to vary the distance between the element and the guide, and means to effect rotary adjustment of the element relative to the guide.

VAUGHN L. JOHANNESSEN.
SIDNEY T. SWALLOW.